US009626561B2

United States Patent
Cho et al.

(10) Patent No.: US 9,626,561 B2
(45) Date of Patent: Apr. 18, 2017

(54) METHOD AND APPARATUS FOR CONNECTING DEVICES USING EYE TRACKING

(71) Applicant: Samsung Electronics Co., Ltd., Suwon-si, Gyeonggi-do (KR)

(72) Inventors: Chihyun Cho, Suwon-si (KR); Kyunghee Lee, Ansan-si (KR); Kenhyung Park, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/322,210

(22) Filed: Jul. 2, 2014

(65) Prior Publication Data
US 2015/0016674 A1     Jan. 15, 2015

(30) Foreign Application Priority Data

Jul. 12, 2013 (KR) .......... 10-2013-0081901

(51) Int. Cl.
*G06K 9/00* (2006.01)
*G06F 3/01* (2006.01)
*G06F 3/038* (2013.01)

(52) U.S. Cl.
CPC ......... *G06K 9/00597* (2013.01); *G06F 3/013* (2013.01); *G06F 3/038* (2013.01); *G06K 9/00335* (2013.01); *G06F 2203/0381* (2013.01)

(58) Field of Classification Search
CPC ............ G06K 9/00335; G06K 9/00597; G06F 2203/0381; G06F 3/038; G06F 3/013
USPC ........................................................ 382/103
See application file for complete search history.

(56) References Cited

U.S. PATENT DOCUMENTS

| | | |
|---|---|---|
| 2007/0024579 A1 | 2/2007 | Rosenberg |
| 2012/0105486 A1* | 5/2012 | Lankford ............... G06F 3/013 345/661 |
| 2012/0113223 A1 | 5/2012 | Hilliges et al. |
| 2012/0154557 A1 | 6/2012 | Perez et al. |
| 2013/0042010 A1 | 2/2013 | Reunamaki et al. |

FOREIGN PATENT DOCUMENTS

| | | |
|---|---|---|
| EP | 2613226 A1 | 7/2013 |
| KR | 10-2011-0126438 A | 11/2011 |

* cited by examiner

*Primary Examiner* — Yon Couso
(74) *Attorney, Agent, or Firm* — Jefferson IP Law, LLP

(57) ABSTRACT

A method for connecting an electronic device using an eye-tracking technique and an electronic device that implements the method are provided. The method includes acquiring eye-tracking information, obtaining image information corresponding to the eye-tracking information, comparing the image information with specific information about at least one external device, and based on the comparison, determining a specific external device to be connected from among the at least one external device.

23 Claims, 9 Drawing Sheets

METHOD AND APPARATUS FOR CONNECTING DEVICES USING EYE TRACKING

CROSS-REFERENCE TO RELATED APPLICATION(S)

This application claims the benefit under 35 U.S.C. §119(a) of a Korean patent application filed on Jul. 12, 2013 in the Korean Intellectual Property Office and assigned Serial number 10-2013-0081901, the entire disclosure of which is hereby incorporated by reference.

TECHNICAL FIELD

The present disclosure relates to a method for allowing a connection between electronic devices through various communication techniques and to an electronic device implementing the method.

BACKGROUND

A wearable electronic device is a device that can be worn by a user of the electronic device. Normally such a wearable electronic device may have an input unit, a sensor, a display unit, a wireless communication unit, and the like, and is able to perform voice and video processes.

With technologies of small-sized optical devices remarkably advanced progressively, a wearable electronic device makes it possible to overlay an artificial image on a user's field of vision by disposing an image display at a nearer position from the user's eyes. Sometimes such a wearable electronic device may be referred to as a near-eye display, a head-mounted display, a head-up display, and the like.

Meanwhile, electronic devices capable of data communication are on an increasing trend. For example, a wireless network function, such as Wireless Fidelity (Wi-Fi), Bluetooth, Zigbee, Ultra Wideband (UWB), and the like, is now widely used in electric home appliances, such as Television (TV), audio equipment, and the like, as well as portable devices, such as a smart phone, a tablet Personal Computer (PC), and the like.

Nevertheless, there are only a few device connection techniques available for a data communication between a wearable electronic device and any other electronic device capable of a data communication.

Therefore, a need exists for a method for allowing a connection between electronic devices through various communication techniques and to an electronic device implementing the method.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for connecting an electronic device using an eye-tracking technique and also to provide an electronic device that implements this method.

In accordance with an aspect of the present disclosure, a method for connecting an electronic device using an eye tracking technique is provided. The method includes acquiring eye-tracking information, obtaining image information corresponding to the eye-tracking information, comparing the image information with specific information about at least one external device, and based on the comparison, determining a specific external device to be connected from among the at least one external device.

In accordance with another aspect of the disclosure, a method for connecting an electronic device using an eye tracking technique is provided. The method includes obtaining image information, acquiring eye-tracking information, based on the eye-tracking information, selecting a first image region associated with a first external device and a second image region associated with a second external device from the image information, comparing the first image region with stored first external device information and also comparing the second image region with stored second external device information, and if there are the first external device information related to the first image region and the second external device information related to the second image region, requesting a connection between the first and second external devices.

In accordance with another aspect of the disclosure, an electronic device is provided. The electronic device includes an eye tracking unit configured to acquire eye-tracking information, an object recognition unit configured to obtain image information corresponding to the eye-tracking information, a control unit configured to compare the image information with specific information about at least one external device, and based on the comparison, to determine a specific external device to be connected from among the at least one external device.

In accordance with another aspect of the disclosure, a computer-readable medium recording thereon a program configured to define control commands for acquiring eye-tracking information is provided. The computer-readable medium includes obtaining image information corresponding to the eye-tracking information, comparing the image information with specific information about at least one external device, and based on the comparison, determining a specific external device to be connected from among the at least one external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a device" includes reference to one or more of such devices.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Embodiments of the present disclosure provide a method for allowing a connection between electronic devices through various communication techniques and to an electronic device implementing the method.

Figure 1:
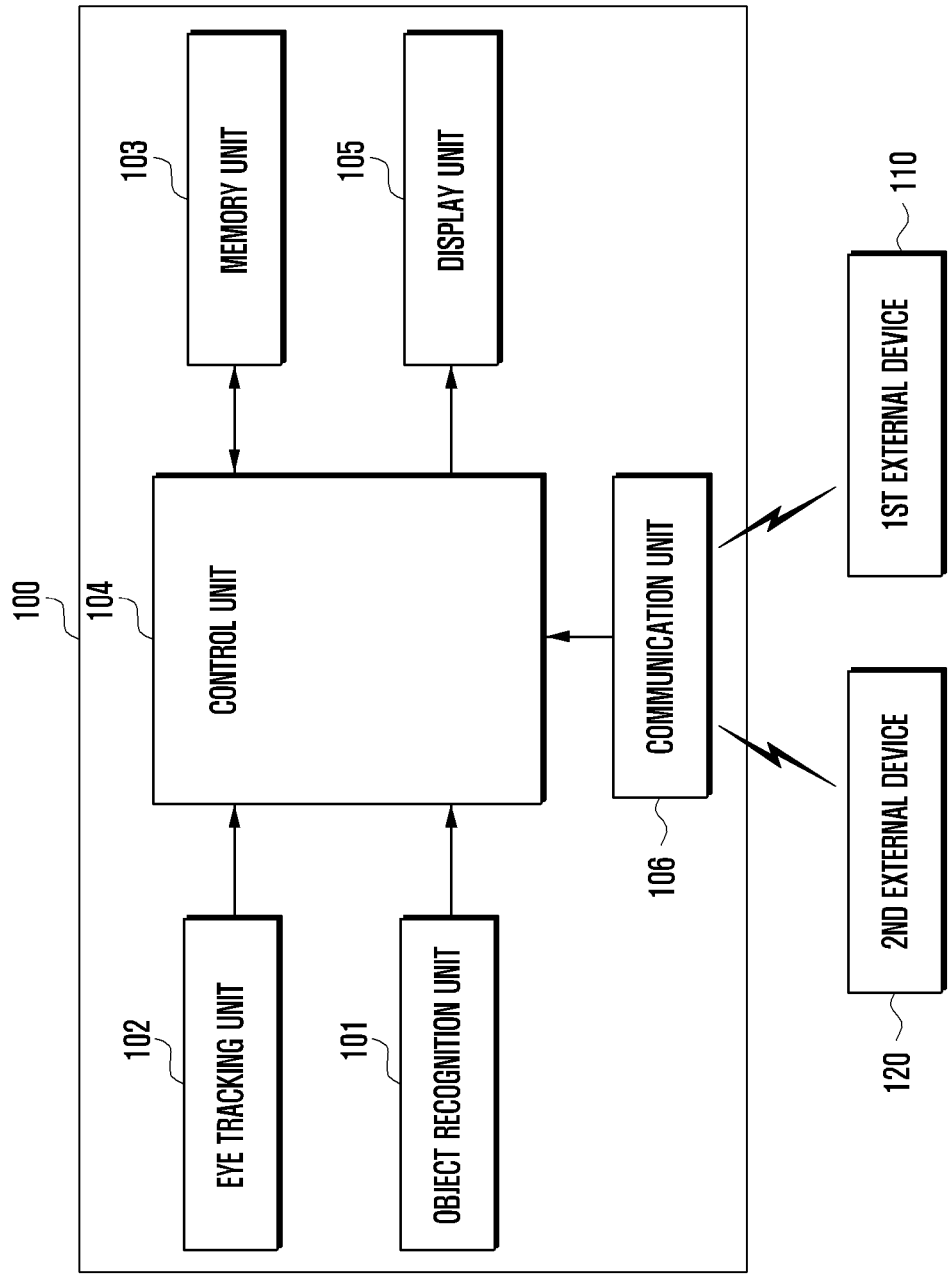
FIG. 1 is a block diagram illustrating an electronic device according to an embodiment of the present disclosure.

FIG. 1 is a block diagram illustrating an electronic device according to an embodiment of the present disclosure.

Referring to FIG. 1, an electronic device 100 may include an object recognition unit 101, an eye tracking unit 102, a memory unit 103, a control unit 104, a display unit 105, and a communication unit 106, but is not limited thereto.

The object recognition unit 101 is a device capable of recognizing external environments of the electronic device 100 and may include, for example, a lens and an image sensor, such as a Charge Coupled Device (CCD), a Complementary Metal Oxide Semiconductor (CMOS), and the like. The object recognition unit 101 may acquire image information in the direction of user's eyes.

The eye tracking unit 102 is a device capable of tracking user's eyes and, for example, may detect the position of a user's pupil and then, using the detected position of a user's pupil, determine the direction of user's eyes. Techniques to track a user's eyes may be classified mainly into two types, as follows.

The first type of eye tracking techniques is to use an optical system. The Dual Purkinje System performs eye-tracking by recognizing the reflection of light from front and rear surfaces of a cornea and then by geometrically calculating the direction of reflected light, the Bright Pupil System performs eye-tracking by tracking a glittering effect produced at a cornea by infrared rays applied thereto, the Dark Pupil System performs eye-tracking by tracking a dark ellipse with high contrast produced at a pupil which absorbs most of infrared rays applied at a specific angle, and the like.

The second type of eye tracking techniques is to use a variation in an electric field or a magnetic field around the eyes. The Electrical Oculography (EOG) performs eye-tracking by tracking a variation in an electric field through a difference in polarity of eyes, the Coil System performs eye-tracking by tracking a variation in a magnetic field from a magnetic coil attached around eyes, and the like.

In order to track a user's eyes, the eye tracking unit 102 may use, for example, the Dual Purkinje System, the Bright Pupil System, the Dark Pupil System, the EOG, and the Coil System, but is not limited thereto.

Additionally, to track a user's eyes, the eye tracking unit 102 may include, for example, an image sensor, a brain wave sensor, and the like. The image sensor may have an infrared light source and/or an infrared camera. In order to obtain eye-tracking information, the image sensor may apply a beam of near-infrared light to user's eyes by using the infrared light source and then detects near-infrared light reflected on a user's pupil by using the infrared camera.

The memory unit 103 may store a variety of programs and data used for the operation of the electronic device 100. For example, the memory unit 103 may store an operating system for booting the electronic device 100 and any other essential or optional programs for the electronic device 100. Further, the memory unit 103 may store data created or received in the use of the electronic device 100. The memory unit 103 may be formed of Read Only Memory (ROM), Random Access Memory (RAM), and the like.

More specifically, in an embodiment of the present disclosure, the memory unit 103 may store information about at least one external device. For example, the memory unit 103 may store information about a first external device 110 and/or a second external device 120. Further, the memory unit 103 may store information about the first external device 110 as the first external device information and also store information about the second external device 120 as the second external device information. Here, the first external device information and the second external device information may indicate title information, such as a model name of each of the first and second external devices 110 and 120, connection information, such as a wireless interface standard used by each of the first and second external devices 110 and 120, communication information, such as a physical address (e.g., a MAC address) of each of the first and second external devices 110 and 120, and/or appearance information of each of the first and second external devices 110 and 120. In this embodiment of the present disclosure, external device information may contain at least one of title information, connection information, communication information, appearance information, and the like.

The electronic device 100 may receive the first and second external device information from the first and second external devices 110 and 120 or from a specific server through the communication unit 106. The received first and second external device information may be transferred to the memory unit 104. Alternatively, such information may be received through an input unit (not shown) and transferred to the memory unit 104.

Based on eye-tracking information obtained by the eye tracking unit 102, the control unit 104 may select an image region associated with the appearance of the first external device 110 from image information about external environments obtained by the object recognition unit 101. For example, the control unit 104 may compare such a selected image region with the first external device information stored in the memory unit 103 and, if there is the first external device information related to the selected image region, may request a wireless connection between the electronic device 100 and the first external device 110. For example, the control unit 104 may compare the selected image region with the appearance information or the communication information from among the first external device information and thereby recognize the first external device 110. Thereafter, using the connection information, the control unit 104 may transmit a request for connection to the first external device 110 through the communication unit 106.

Additionally, in another embodiment of the present disclosure, the electronic device 100 may establish a connection with the second external device 120 while another connection has been already formed with the first external device 110.

In this embodiment of the present disclosure, like a connection between the electronic device 100 and the first external device 110, the control unit 104 may select, based on eye-tracking information obtained by the eye tracking unit 102, an image region associated with the appearance of the second external device 120 from image information about external environments obtained by the object recognition unit 101. The control unit 104 may compare such a selected image region with the second external device information stored in the memory unit 103. When there is the second external device information related to the selected image region, the control unit 104 may request a wireless connection between the electronic device 100 and the second external device 120. The control unit 104 may compare the selected image region with the appearance information or the communication information from among the second external device information and thereby recognize the second external device 120. Thereafter, using the connection information, the control unit 104 may transmit a request for connection to the second external device 120 through the communication unit 106.

Further, in still another embodiment of the present disclosure, the electronic device 100 may connect the first external device 110 and the second external device 120.

In this embodiment of the present disclosure, the control unit 104 may transmit a request for connection with the first external device 110 to the second external device 120 or transmit a request for connection with the second external device 120 to the first external device 110. Under the control of the control unit 104, the communication unit 106 may transmit the first external device information to the second external device 120 and also transmit the second external device information to the first external device 110.

In this case, the first external device 110 or the second external device 120 may obtain the connection information or the communication information about any connection opponent by using the second external device information or the first external device information received from the electronic device 100. Thereafter, in response to a request for a wireless connection from the electronic device 100, the first and second external devices 110 and 120 may perform a communication with each other.

In yet another embodiment of the present disclosure, the control unit 104 may select, based on eye-tracking information obtained by the eye tracking unit 102, both the first image region associated with the appearance of the first external device 110 and the second image region associated with the appearance of the second external device 120 from image information about external environments obtained by the object recognition unit 101. The control unit 104 may compare such a selected first image region with the first external device information stored in the memory unit 103 and also compare such a selected second image region with the second external device information. When there are the first external device information related to the selected first image region and the second external device information related to the selected second image region, the control unit 104 may request a wireless connection between the first and second external devices 110 and 120. In response to this request, the first and second external devices 110 and 120 may perform a wireless communication operation between them.

In response to a request for a connection with any device from the control unit 104, the communication unit 106 may perform a communication between the electronic device 100 and the requested external device 110 or 120 or between the electronic device 100 and the requested specific server. Further, the communication unit 106 may receive the first external device information and/or the second external device information from the first external device 110, the second external device 120, and/or any specific server.

Additionally, under the control of the control unit 104, the communication unit 106 may transmit the first external device information to the second external device 120 and also transmit the second external device information to the first external device 110.

The communication unit 106 may establish a communication channel for a voice call or the transmission of an image or data under the control of the control unit 104. For example, the communication unit 106 may form a voice call channel, a video call channel, a data communication channel, or the like. Here, a data communication channel may include a communication channel for a video call, an instant message service, a chatting service, transmission or download of data, or the like. The communication unit 106 may include a Radio Frequency (RF) transmitter that up-converts the frequency of an outgoing signal and amplifies the signal, an RF receiver that amplifies with low-noise an incoming signal and down-converts the frequency of the signal, and the like. When the electronic device 100 supports a short-range communication function, such as Wi-Fi, Bluetooth, Zigbee, Ultra Wideband (UWB), Near Field Communication (NFC), or the like, the communication unit 106 may be formed of a Wireless Fidelity (Wi-Fi) module, a Bluetooth module, a Zigbee module, a UWB module, an NFC module, or the like.

Meanwhile, the electronic device 100 may further include an input unit (not shown) for receiving the first external device information and/or the second external device information using a user's input. In addition, the electronic device 100 may further include an audio processing unit (not shown) for processing collected audio data or for outputting audio data used for the operation of the electronic device 100, audio data associated with the playback of any audio file stored in the memory unit 103, audio data received from the outside, and the like.

Figure 2A:
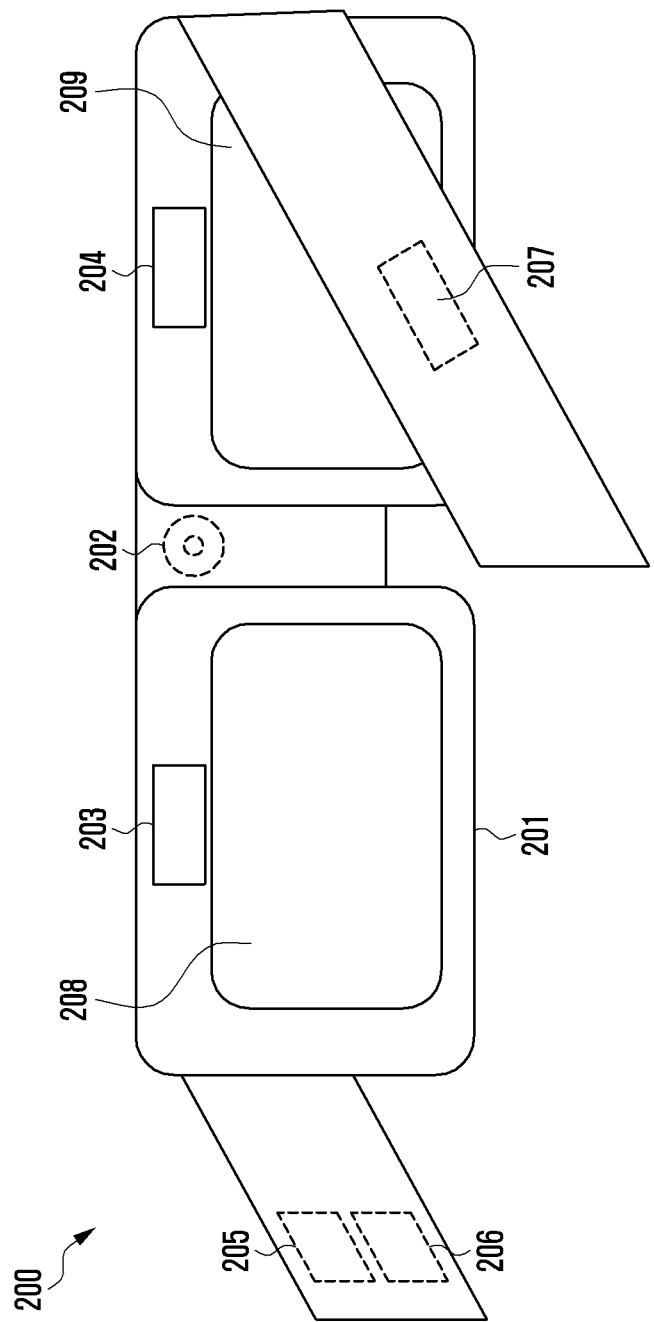
FIGS. 2A and 2B are schematic views illustrating a configuration of an electronic device according to an embodiment of the present disclosure.
Figure 2B:
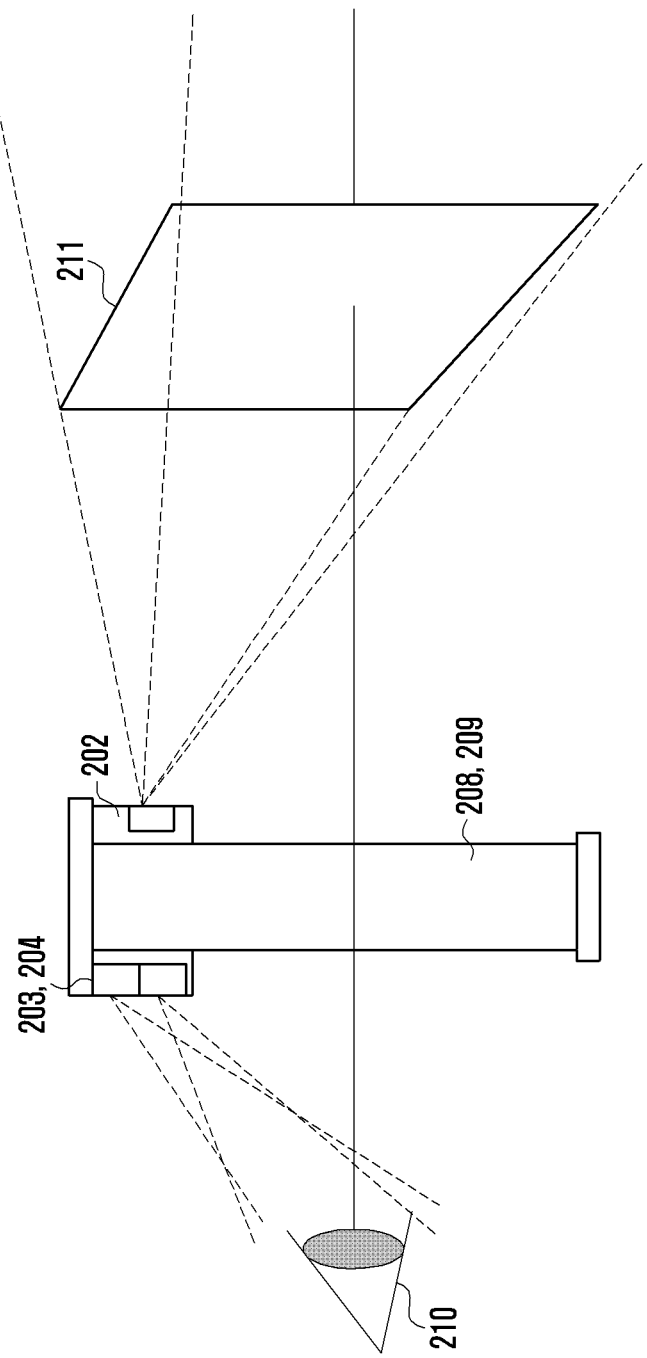

FIGS. 2A and 2B are schematic views illustrating a configuration of an electronic device according to an embodiment of the present disclosure.

Referring to FIG. 2A, an electronic device 200 may include a wearable unit 201, an object recognition unit 202, two eye tracking units 203 and 204, a memory unit 205, a control unit 206, a communication unit 207, and two display units 208 and 209.

The wearable unit 201 is a sort of housing that can mount thereon or therein the object recognition unit 202, the eye tracking units 203 and 204, the memory unit 205, the control unit 206, the communication unit 207, and the display units 208 and 209. The wearable unit 201 may be mounted on a user's head, for example. The wearable unit 201 may have a structure of glasses, for example.

Referring to FIGS. 2A and 2B, the object recognition unit 202 is a device that is mounted on or in the wearable unit 201 and has the ability to recognize external environments of the electronic device 200. The object recognition unit 202 may include a lens and a CCD or CMOS image sensor. The object recognition unit 202 may acquire image information 211 in a direction of user's eyes 210.

Referring to FIGS. 2A and 2B, the eye tracking units 203 and 204 are devices that are mounted on or in the wearable unit 201 and have the ability to track a user's eyes 210 by detecting the position of a user's pupil and then, based on the detected position of a user's pupil, determining the direction of user's eyes. Each of the eye tracking units 203 and 204 may include an image sensor to track the user's eyes 210. The image sensor may have an infrared light source and/or an infrared camera. The image sensor may obtain eye-tracking information by applying a beam of near-infrared light to user's eyes through the infrared light source and then by detecting near-infrared light reflected on a user's pupil through the infrared camera.

For example, the first eye tracking unit 203 may track a user's left eye, and the second eye tracking unit 204 may tract a user's right eye. In another embodiment of the present disclosure, a single eye tracking unit (e.g., 102 in FIG. 1) may be used to track the left eye and/or the right eye.

Referring to FIG. 2A, the memory unit 205 is mounted on or in the wearable unit 201 and may store information about any external device. Such external device information may indicate title information, such as a model name of an external device, connection information, such as a wireless interface standard used by an external device, communication information, such as a physical address (e.g., a MAC address) of an external device, and/or appearance information of an external device. In this embodiment of the present disclosure, the external device information may contain at least one of title information, connection information, communication information, and appearance information.

Referring to FIG. 2A, the control unit 206 is mounted on or in the wearable unit 201 and, based on eye-tracking information obtained by the eye tracking units 203 and 204, may select an image region associated with the appearance of a certain external device from image information about external environments obtained by the object recognition unit 202. The control unit 206 may compare such a selected image region with external device information stored in the memory unit 205 and, if there is any external device information related to the selected image region, may request a wireless connection between the electronic device 200 and a relevant external device. Here, the control unit 206 may compare the selected image region with the appearance information or the communication information from among the external device information and thereby recognize a specific external device. Thereafter, using the connection information, the control unit 206 may transmit a request for connection to the specific external device through the communication unit 207.

Referring to FIG. 2A, the communication 207 is mounted on or in the wearable unit 201 and, in response to a request for a connection with any device from the control unit 206, may perform a communication between the electronic device 200 and any requested external device or between the electronic device 200 and the requested specific server. Further, the communication unit 207 may receive external device information from at least one external device and/or any specific server. Further, the communication unit 207 may transmit such external device information to any other external device under the control of the control unit 206.

Referring to FIGS. 2A and 2B, the display units 208 and 209 are mounted on or in the wearable unit 201 and may display an external image (e.g., a real environment image) thereon or overlay an artificial image, outputted under the control of the control unit 206, on such an external image.

The display units 208 and 209 may be formed of a transparent display that allows the outside to be seen.

Additionally, the display units 208 and 209 may use or be based on the Virtual Retina Display (VRD) technique that directly projects an artificial image onto a user's retina, the Magnifying Glass technique that magnifies an artificial image through optical mechanism and then transfers it to a user's retina, the Relay Lens technique that adjusts the focus of an artificial image through several lenses and then transfers it to a user's retina, and the like.

Here, the first display unit 208 displays an image on a user's left eye, and the second display unit 209 displays an image on a user's right eye. In an alternative embodiment of the present disclosure, a single display unit may be used to display an image on the left eye and/or the right eye.

Figure 3:
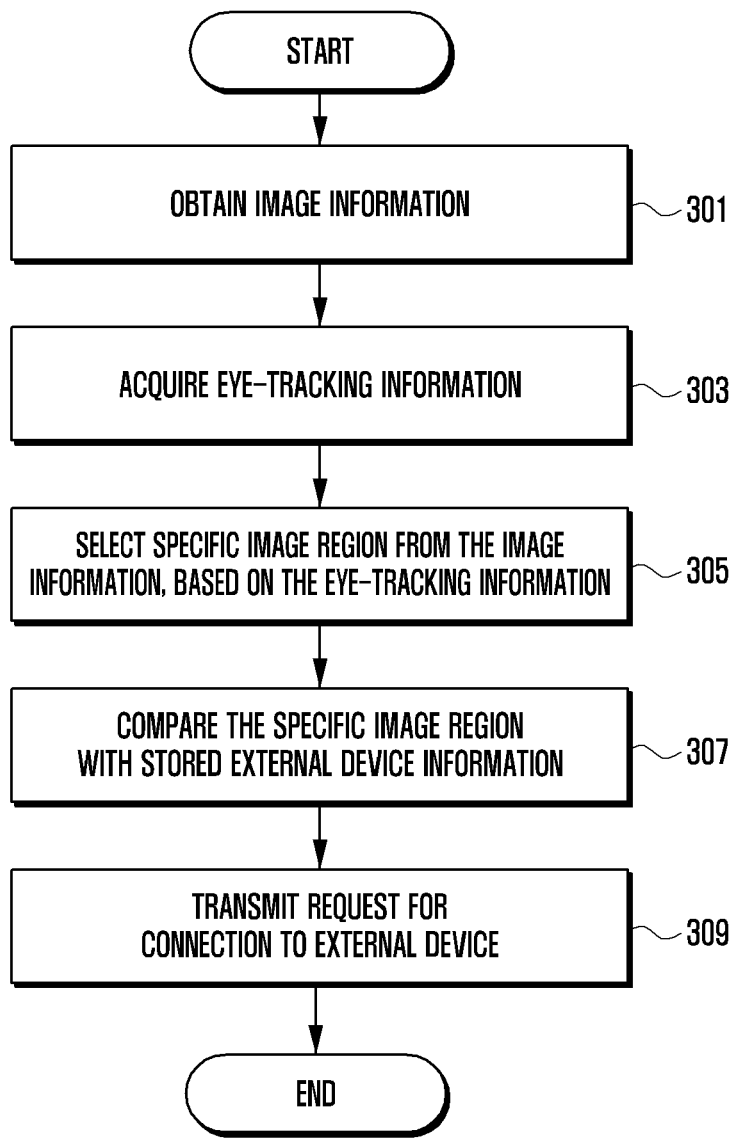
FIG. 3 is a flow diagram illustrating a method for connecting an electronic device using an eye tracking technique according to an embodiment of the present disclosure.

FIG. 3 is a flow diagram illustrating a method for connecting an electronic device using an eye tracking technique according to an embodiment of the present disclosure.

Referring to FIGS. 1 and 3, at operation 301, the electronic device 100 may obtain image information through the object recognition unit 101 capable of recognizing external environments.

At operation 303, the electronic device 100 may track a user's eyes through the eye tracking unit 102. Using data on the user's eyes detected through the eye tracking unit 102, the control unit 104 may acquire the coordinates of eye-tracking on a plane of the display unit.

At operation 305, the electronic device 100 may select, based on eye-tracking information acquired by the eye tracking unit 102, a specific image region from image information obtained by the object recognition unit 101. The specific image region may be an image region associated with the appearance of a certain external device.

At operation 307, the electronic device 100 may compare the selected image region with the stored external device information. The memory unit 103 may store therein any received external device information under the control of the control unit 104. This information may be received from any external device or specific server through the communication unit 106. Alternatively or additionally, this information may be received through the input unit. The external device information may indicate title information, such as a model name of an external device, connection information, such as a wireless interface standard used by an external device, communication information, such as a physical address (e.g., a MAC address) of an external device, and/or appearance information of an external device. In this embodiment of the present disclosure, the external device information may contain at least one of title information, connection information, communication information, and appearance information.

At operation 309, if there is any external device information related to the selected image region, the electronic device 100 may transmit to a relevant external device a request for connection. For example, when the selected image region related to the appearance of a specific external device selected through image information is identical to the appearance information of the stored external device information, the electronic device 100 may transmit a request for connection to a corresponding external device based on the communication information or the connection information. Thereafter, in response to such a request, the external device may establish a communication channel with the electronic device 100.

Figure 4:
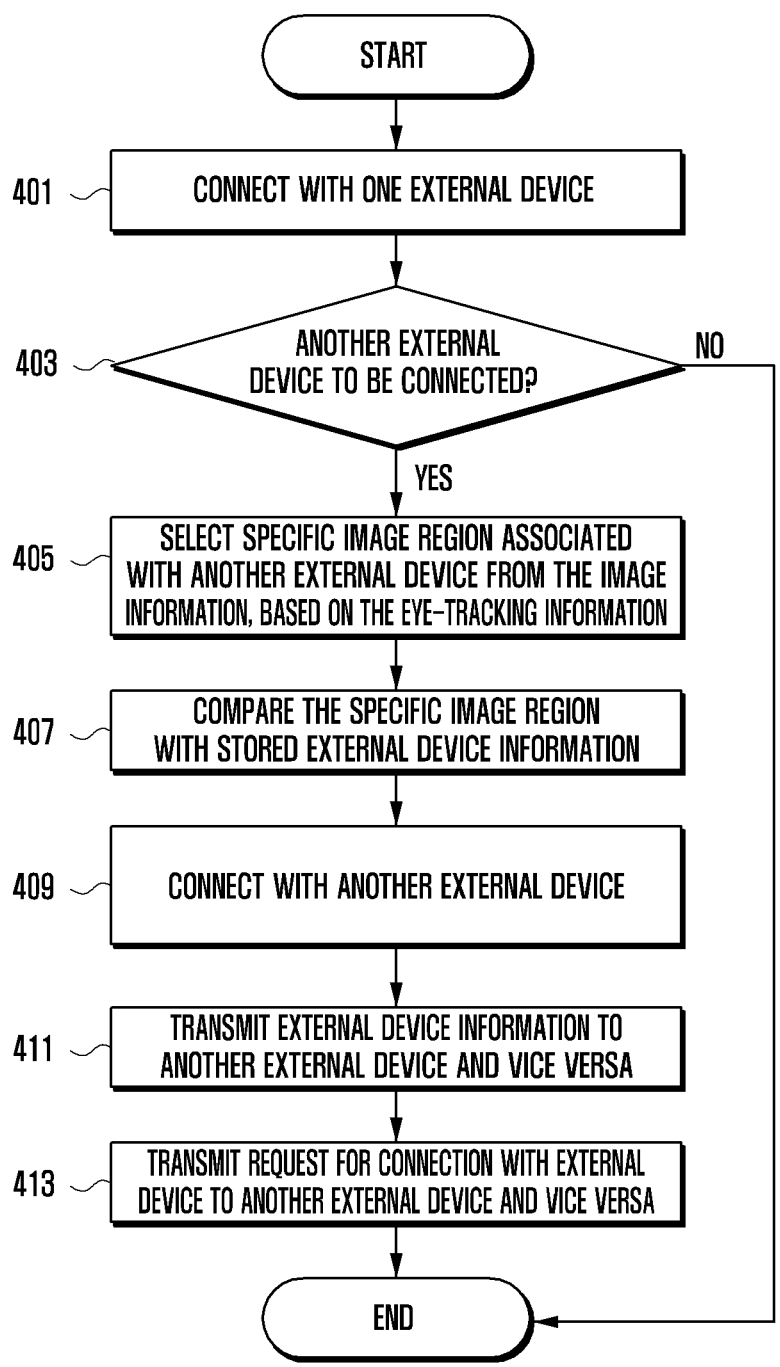
FIG. 4 is a flow diagram illustrating a method for connecting external devices using an eye tracking technique according to an embodiment of the present disclosure.

FIG. 4 is a flow diagram illustrating a method for connecting external devices using an eye tracking technique according to an embodiment of the present disclosure.

Referring to FIGS. 1 and 4, at operation 401, the electronic device 100 may perform a communication connection with another external device when a communication connection with one external device has been already performed using eye tracking.

At operation 403, if any external device different from the already connected external device is recognized in the image information, the electronic device 100 may determine whether to connect with the recognized device. For example, the electronic device 100 may display through the display unit 105 whether any other external device is recognized or connected.

At operation 405, when it is determined to connect with a specific external device, the electronic device 100 may select, based on the eye-tracking information acquired by the eye tracking unit 102, an image region related to the specific external device from the image information obtained by the object recognition unit 101.

At operation 407, the electronic device 100 may compare the selected image region with the stored external device information. The memory unit 103 may store therein any received external device information under the control of the control unit 104. This information may be received from any external device or specific server through the communication unit 106. Alternatively or additionally, this information may be received through the input unit. The external device information may indicate, for example, title information, such as a model name of an external device, connection information, such as a wireless interface standard used by an external device, communication information, such as a physical address (e.g., a MAC address) of an external device, and/or appearance information of an external device. In this embodiment of the present disclosure, the external device information may contain at least one of title information, connection information, communication information, and appearance information.

At operation 409, if there is any external device information identical to the selected image region, the electronic device 100 may transmit to a relevant external device a request for connection. For example, when the selected image region is identical to the appearance information of the stored external device information, the electronic device 100 may transmit a request for connection to a corresponding external device based on the communication information or the connection information. Thereafter, in response to such a request, the external device may establish a communication channel with the electronic device 100.

If the electronic device 100 completes operation 409 in this embodiment, communication channels are established between the electronic device 100 and the first external device and between the electronic device 100 and the second external device. Namely, using the eye-tracking technique and the appearance information, the electronic device 100 may establish communication channels with two or more external devices to perform a data communication.

In this case, the electronic device 100 may further establish a communication channel between the first and second external devices. For example, if the first external device is TV and if the second external device is audio equipment, the electronic device 100 may form a wireless channel between TV and audio equipment such that audio equipment can process audio data outputted from TV. To form a channel between external devices, one external device has already had or has to have information about the other external device.

At operation 411, the electronic device 100 may transfer the stored or received external device information to any other external device. For example, through the communication unit 106, the electronic device 100 may transmit the first external device information to the second external device and also transmit the second external device information to the first external device.

At operation 413, the electronic device 100 may transmit a request for connection with the first external device to the second external device or transmit a request for connection with the second external device to the first external device. Based on such a request of the electronic device 100, a channel between the first and second external devices may be established via or regardless of the electronic device 100.

Figure 5A:
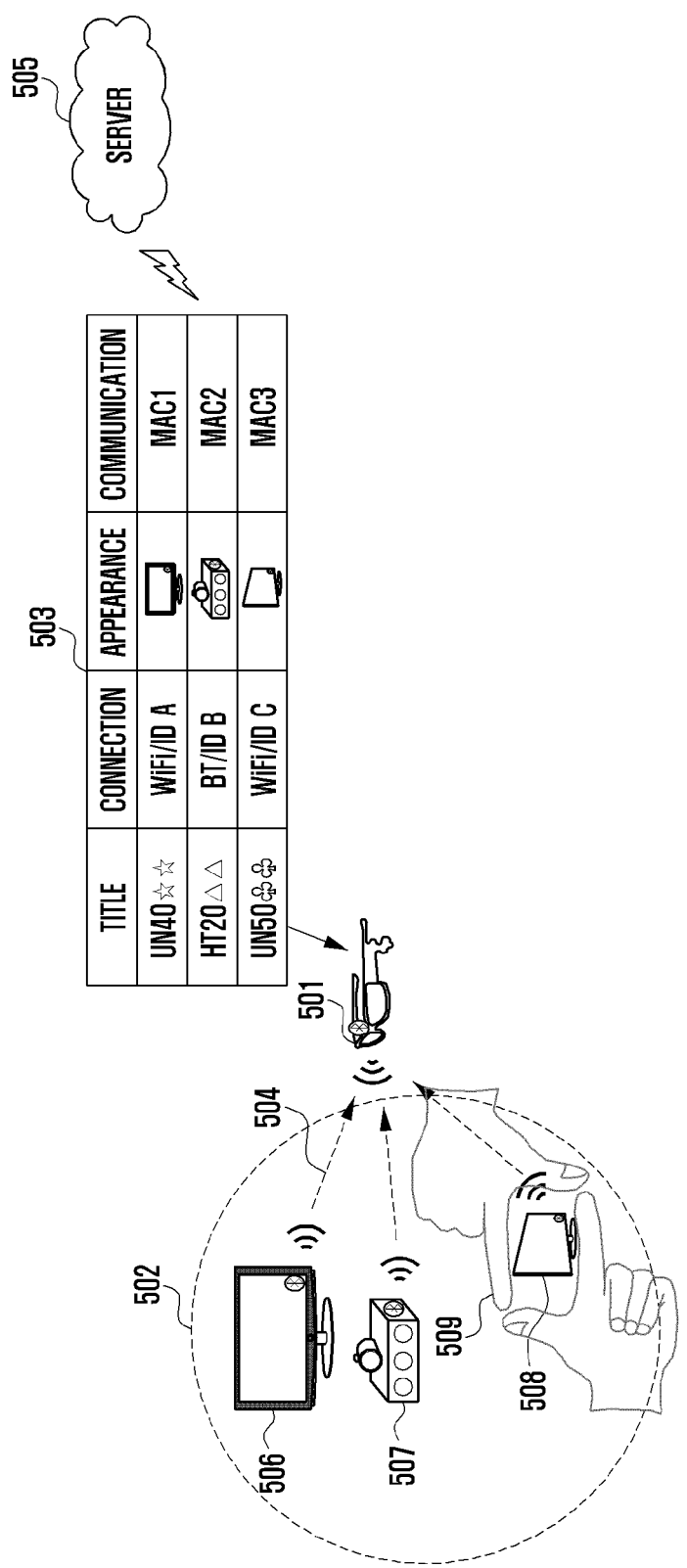
FIGS. 5A and 5B are schematic views illustrating a method for connecting an electronic device using an eye tracking technique according to an embodiment of the present disclosure.
Figure 5B:
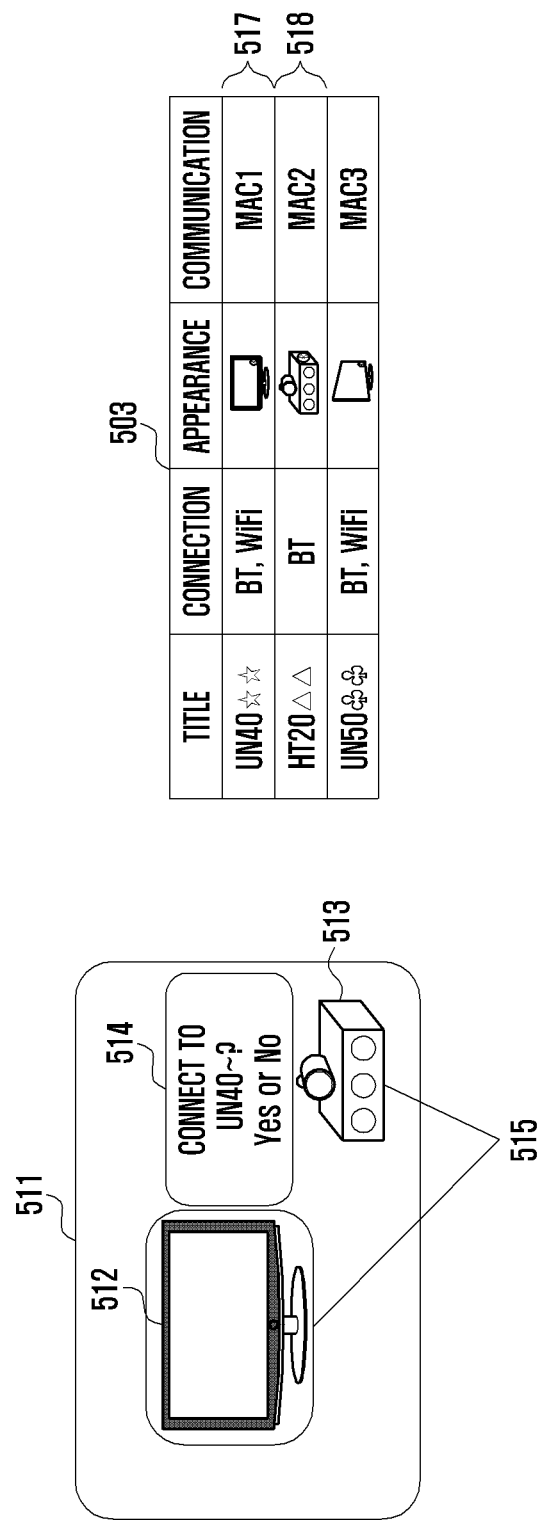

FIGS. 5A and 5B are schematic views illustrating a method for connecting an electronic device using an eye tracking technique according to an embodiment of the present disclosure.

Referring to FIG. 5A, an electronic device 501 may obtain an external environment image 502. Thereafter, from the obtained external environment image 502, the electronic device 501 may select an image region associated with external devices 506, 507, and 508.

The electronic device 501 may compare the selected image region with stored external device information 503 and, based on eye-tracking information, may transmit a request for connection to at least one of the external devices 506, 507, and 508 in order to perform a data communication with at least one of the external devices 506, 507, and 508.

Here, the stored external device information 503 may contain at least one of title information, connection information, communication information, and appearance information about each external device. Such information 503 may be received through a user input and then stored in the electronic device 501, and/or received from a specific server 505, and/or received 504 from the external devices 506, 507 and 508.

Referring to FIG. 5A, if some of the external devices 506, 507, and 508 have the same appearance information, for example, if two external devices 506 and 508 of monitor type have the same appearance information, the electronic device 501 may be first connected to an arbitrary device 506. The electronic device 501 may distinguish between such external devices 506 and 508 having the same appearance information by creating a specific notification, e.g., sound, light, or vibration, from the connected device 506. For this, the electronic device 501 may further include an audio processing unit (not shown, having a microphone and a speaker) for creating sound, and a vibrator (not shown) for creating vibration. The display unit 105 may create light.

In another embodiment of the present disclosure, a user may take a gesture 509 focusing on a desired external device 508 from among the external devices 506, 507, and 508. In this case, the electronic device 501 may obtain gesture information 509 through the object recognition unit 101.

Referring to FIG. 5A, the electronic device 501 may store gesture information in the memory unit 103. For example, such gesture information may be received from a specific server through the communication unit 106 and then stored in the memory unit 103. Alternatively or additionally, the object recognition unit 101 may recognize a user's gesture and then store it as gesture information in the memory unit 103. The control unit 104 may compare the gesture information 509 obtained through the object recognition unit 101 with the gesture information stored in the memory unit 103, and thereby perform a wireless communication with the desired external device 508.

Using the eye-tracking information acquired through the eye tracking unit 102, the gesture information 509 obtained through the object recognition unit 101, and/or the appearance information of the selected external device 508, the electronic device 501 may transmit a request for a wireless connection to the selected external device 508 through the communication unit 106 and establish a wireless connection with that device 508.

In an embodiment of the present disclosure, the gesture information 509 may be an action to form a frame with both hands toward a certain external device. Alternatively, an action to draw a circle with a finger, an action to indicate any external device with a finger, and the like may be defined and used as the gesture information.

Referring to FIGS. 5A and 5B, when a wireless link is made with each of the first external device 512 and the second external device 513, the electronic device 501 may try to connect the first and second external devices 512 and 513.

The external environment image obtained by the electronic device 501 may be offered to a user through a display unit 511 of the electronic device 501. Further, the electronic device 501 may display on the display unit 511 a popup window 514 that inquires whether to connect such external devices 512 and 513. In this case, the electronic device 501 may show connection-target devices through a user interface 515. If a user determines to connect the first and second external devices 512 and 513, the electronic device 501 may transmit the second external device information 518 to the first external device 512 and also transmit the first external device information 517 to the second external device 513. Thereafter, the electronic device 501 may transmit a request for connection with the first external device 512 to the second external device 513 or transmit a request for connection with the second external device 513 to the first external device 512.

Figure 6:
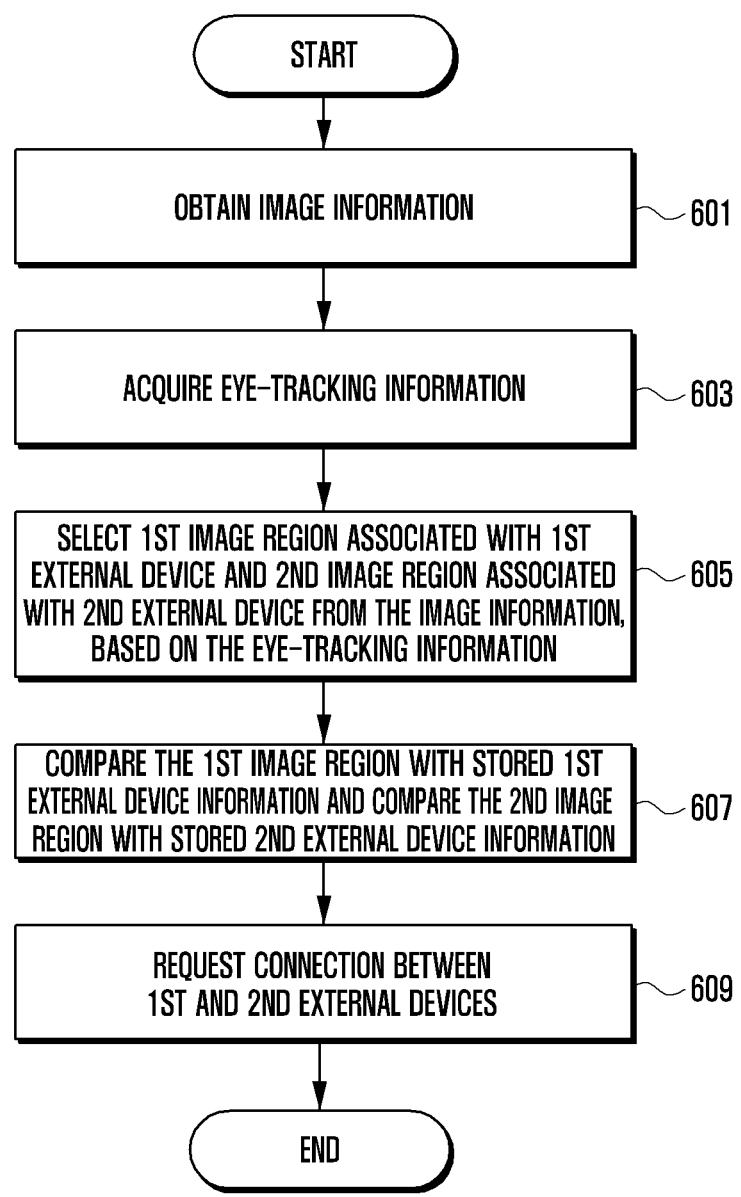
FIG. 6 is a flow diagram illustrating a method for connecting external devices using an eye tracking technique according to an embodiment of the present disclosure.

FIG. 6 is a flow diagram illustrating a method for connecting external devices using an eye tracking technique according to an embodiment of the present disclosure.

Referring to FIGS. 1 and 6, at operation 601, the electronic device 100 may obtain external environment image information through the object recognition unit 101.

At operation 603, the electronic device 100 may acquire eye-tracking information through the eye tracking unit 102.

At operation 605, the electronic device 100 may select, based on the eye-tracking information acquired by the eye tracking unit 102, the first image region associated with the appearance of the first external device 110 and the second image region associated with the appearance of the second external device 120 from among the image information obtained by the object recognition unit 101.

At operation 607, the electronic device 100 may compare the first image region with the first external device information stored in the memory unit 103, and also compare the second image region with the second external device information stored in the memory unit 103.

At operation 609, if the first image region is identical to the first external device information, and if the second image region is identical to the second external device information, the electronic device 100 may request a wireless connection between the first and second external devices 110 and 120. For example, in this case, the electronic device 100 may transmit the second external device information to the first external device 110 and also transmit the first external device information to the second external device 120. Thereafter, the electronic device 100 may request a wireless connection between the first and second external devices 110 and 120.

Thereafter, in response to such a request, each of the first and second external devices 110 and 120 may perform a wireless communication operation.

Figure 7:
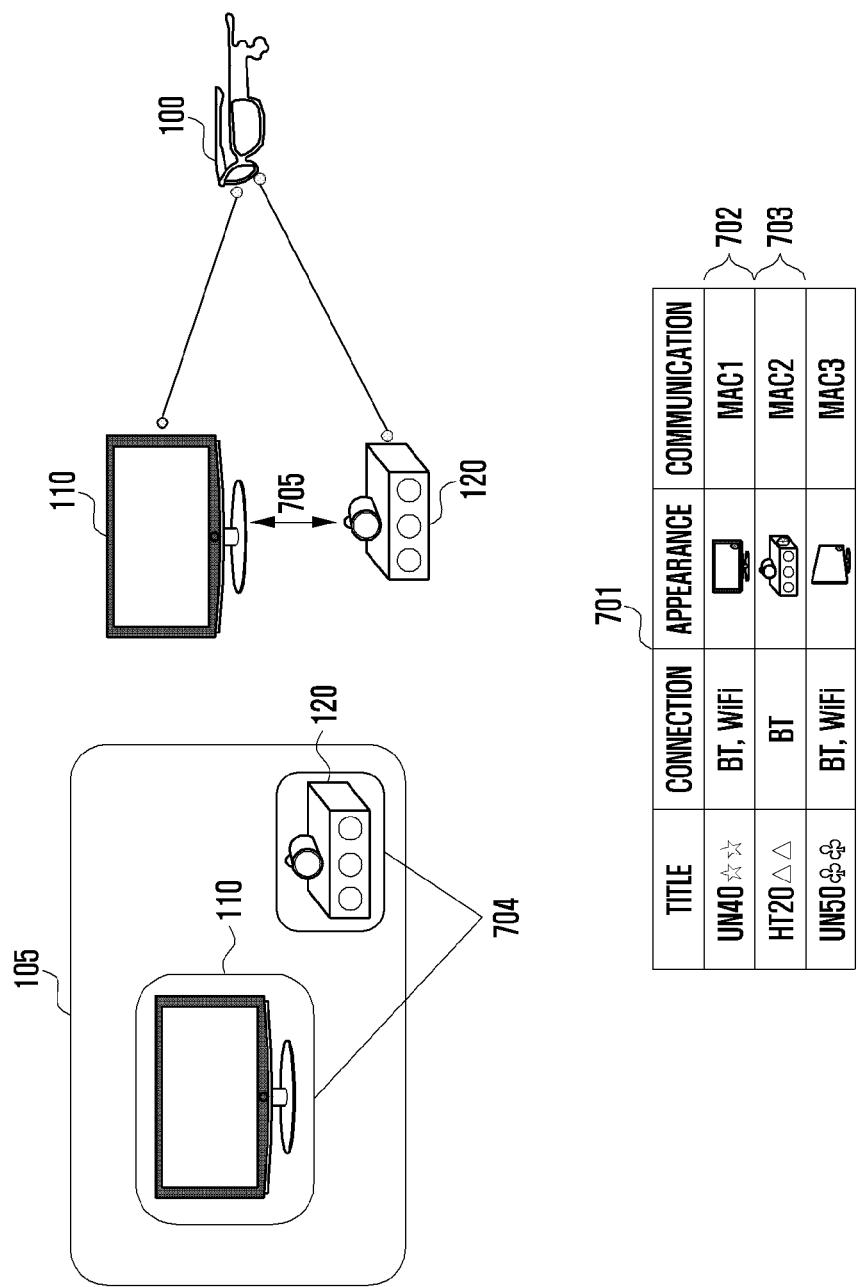
FIG. 7 is a schematic view illustrating a method for connecting an electronic device using an eye tracking technique according to an embodiment of the present disclosure.

FIG. 7 is a schematic view illustrating a method for connecting an electronic device using an eye tracking technique according to an embodiment of the present disclosure.

Referring to FIGS. 1, 6, and 7, the electronic device 100 may perform a wireless connection between the first and second external devices 110 and 120 in operation 705, using the eye-tracking technique.

At first, the external environment image obtained by the electronic device 100 may be offered to a user through the display unit 105 of the electronic device 100. Further, the electronic device 100 may display on the display unit 105 a user interface 704 that indicates whether the first and second external devices 110 and 120 are connected with each other.

If the first image region associated with the first external device 110 selected through the eye-tracking information is identical to the first external device information 702 of external device information 701 about the first external device 110, and if the second image region associated with the second external device 120 selected through the eye-tracking information is identical to the second external device information 703 of external device information 701 about the second external device 120, the electronic device 100 may request a wireless connection between the first and second external devices 110 and 120.

For example, in this case, the electronic device 100 may transmit the second external device information 703 to the first external device 110 and also transmit the first external device information 702 to the second external device 120. Thereafter, the electronic device 100 may request a wireless connection between the first and second external devices 110 and 120.

Thereafter, in response to such a request, each of the first and second external devices 110 and 120 may perform a wireless communication operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for connecting an electronic device using an eye tracking technique, the method comprising:
    acquiring eye-tracking information;
    obtaining image information corresponding to the eye-tracking information, the image information including at least two image regions, wherein each of the at least two image regions respectively relates to each of external devices and at least two of the external devices have a same appearance;
    comparing an image region of the at least two image regions with appearance information about at least one external device for determining whether the image region includes appearance of one of the external devices;
    based on the comparison, determining a specific external device to be connected to the electronic device among the at least two of the external devices;
    determining whether the specific external device is one of the at least two external devices having the same appearance based on the appearance information of each of the external devices; and
    requesting the specific external device to output a specific notification for distinguishing between the specific external device and other external devices, if the specific external device is one of the at least two external devices having the same appearance.

2. The method of claim 1, wherein the comparing of the image region comprises:
    scanning a communication signal in the electronic device; and
    comparing the image region with a portion of the specific information, the portion corresponding to the scanned communication signal.

3. The method of claim 1, wherein the comparing of the image region comprises comparing the image information with an appearance information related to the at least one external device.

4. The method of claim 1, wherein the obtaining of the image region comprises obtaining the image information from the at least one external device, a specific server, and an input device of the electronic device.

5. The method of claim 1, wherein the obtaining of the image information comprises obtaining connection information about the external device.

6. The method of claim 1, wherein the determining of the specific external device comprises determining whether to connect the specific external device to be connected to the electronic device based on user's gesture information.

7. The method of claim 1, wherein, when the external device to be connected is two or more external devices, the determining of the specific external device comprises controlling at least one of the two or more external devices to offer output data.

8. The method of claim 7, wherein the determining of the specific external device comprises connecting the electronic device with the at least one external device when the output data corresponds to the image information.

9. The method of claim 1, further comprising:
    when the electronic device is connected with a further specific external device, controlling a connection between the determined specific external device and the further specific external device.

10. The method of claim 9, wherein the controlling of the connection comprises:
    transmitting connection information about the determined specific external device to the further specific external device, and
    transmitting connection information about the further specific external device to the determined specific external device.

11. A method for connecting an electronic device using an eye tracking technique, the method comprising:
    obtaining image information;
    acquiring eye-tracking information;
    based on the eye-tracking information, selecting a first image region associated with a first external device and a second image region associated with a second external device from the image information, the first and second electronic device being different from the electronic device using the eye tracking technique;
    comparing the first image region with stored first external device information and comparing the second image region with stored second external device information; and
    requesting a connection between the first external device and the second external device, if the first image region matches the first external device information and the second image region matches the second external device information.

12. The method of claim 11, wherein each of the first and second external device information comprises at least one of appearance information, network information, and title information about each of the first and second external devices.

13. The method of claim 11, further comprising:
    receiving the first external device information related to the first image region and the second external device information related to the second image region.

14. The method of claim 13, wherein the receiving of the first external device information comprises receiving the first and second external device information from the first and second external devices, from a specific server, or from an input device of an electronic device.

15. An electronic device comprising:
    a memory configured to store instructions therein;
    an eye tracking sensor configured to acquire eye-tracking information;
    an object recognition sensor configured to obtain image information corresponding to the eye-tracking information, the image information including at least two image regions, wherein each of the at least two image regions respectively relates to each of external devices and at least two of the external devices have the same appearance;
    at least one processor configured, upon execution of the instructions, to:
        compare an image region of the at least two image regions with appearance information about at least one external device for determining whether the image region includes appearance of one of the external devices,
        based on the comparison, determine a specific external device to be connected to the electronic device among the at least two of the external devices,
        determine whether the specific external device is one of the at least two external devices having the same appearance based on the appearance information of each of the external devices, and
        request the specific external device to output a specific notification for distinguishing between the specific external device and other external devices, if the specific external device is one of the at least two external devices having the same appearance.

16. The electronic device of claim 15, further comprising: a memory configured to store at least one of the appearance information, network information, and title information about the at least one external device.

17. The electronic device of claim 15, further comprising: a transceiver configured to receive the specific information from the at least one external device or a specific server.

18. The electronic device of claim 15, further comprising: an input device configured to receive the specific information.

19. The electronic device of claim 15, wherein the at least one processor is further configured to determine whether to connect with the determined external device based on user's gesture information.

20. The electronic device of claim 15, wherein, when the electronic device is connected with a further specific external device, the at least one processor is further configured to control a connection between the determined specific external device and the further specific external device.

21. The electronic device of claim 17, wherein the transceiver is further configured to communicate with a further specific external device in response to a request for connection with the further specific external device.

22. The electronic device of claim 20, wherein the at least one processor is further configured to:
transmit connection information about the determined specific external device to the further specific external device, and
transmit connection information about the further specific external device to the determined specific external device.

23. A non-transitory computer-readable medium recording thereon a program configured to define control commands for:
acquiring eye-tracking information;
obtaining image information corresponding to the eye-tracking information, the image information including at least two image regions, wherein each of the at least two regions respectively relates to each of external devices, and at least two of the external devices have the same appearance;
comparing an image region of the at least two image regions with appearance information about at least one external device for determining whether the image region includes appearance of one of the external devices;
based on the comparison, determining a specific external device to be connected from among the at least two of the external devices;
determining whether the specific external device is one of the at least two external devices having the same appearance based on the appearance information of each of the external devices; and
requesting the specific external device to output a specific notification for distinguishing between the specific external device and other external devices, if the specific external device is one of the at least two external devices having the same appearance.

* * * * *